J. F. BYERS,

Assignor, by mesne assignments, to S. A. FULLER, Trustee.

Oatmeal-Machine.

No. 8,806. Reissued July 15, 1879.

Witnesses:
Geo. W. Coon
Henry Coon.

Inventor:
John F. Byers.
by Francis J. Wing,
his attorney.

N. PETERS, PHOTO-LITHOGRAPHER, WASHINGTON D. C.

UNITED STATES PATENT OFFICE.

JOHN F. BYERS, OF RAVENNA, ASSIGNOR, BY MESNE ASSIGNMENTS, TO SAMUEL A. FULLER, TRUSTEE, OF CLEVELAND, OHIO.

IMPROVEMENT IN OATMEAL-MACHINES.

Specification forming part of Letters Patent No. 210,667, dated December 10, 1878; Reissue No. 8,806, dated July 15, 1879; application filed April 2, 1879.

*To all whom it may concern:*

Be it known that I, JOHN F. BYERS, of the town of Ravenna, in the county of Portage, in the State of Ohio, have invented a new and useful Improvement in Oatmeal-Machines, of which the following is a specification.

My invention relates to that class of oatmeal-machines in which the oats are cut transversely into particles of a desired size.

The object of my invention is to cut the oats by depositing them on a series of thin metallic bars having their sides in contact with each other, and provided with short upward-projecting teeth or knives, which cut the oats between them by the alternate bars having opposite longitudinal reciprocating motions.

Figure 1:
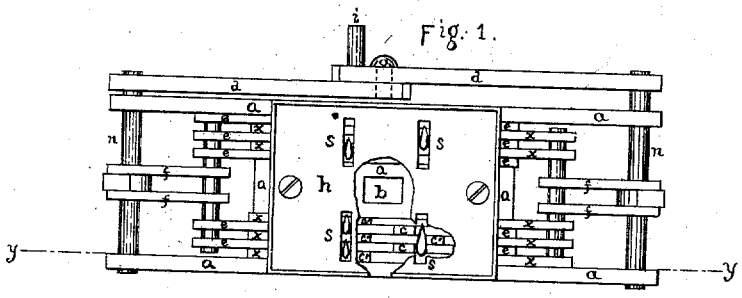
Figure 2:
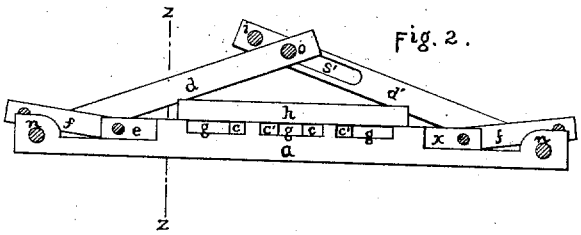
Figure 3:
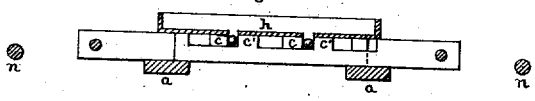
Figure 4:
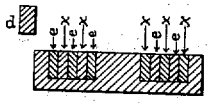

In the drawings, Figure 1 is a top view of the machine. Fig. 2 is a side elevation. Fig. 3 is a longitudinal section at the dotted line in Fig. 1. Fig. 4 is a cross-section at the dotted line in Fig. 2.

The thin metallic bars *e e e* and *x x x* are placed alternately side by side in frame *a*, in contact with each other, so that the grain cannot pass down between them.

The knives *c c'* are short projections on the tops of the bars, having cutting-edges on their sides, there being depressions on the tops of the bars between and on each side of the knives for the meal to pass out laterally through like depressions *g g* on each side of frame *a*, and also through opening *b* in the frame between the two series of bars.

The bars *e* and *x* have reciprocating motions given to them through pitmen *f f*, shafts *n n*, and arms *d d'* by alternately raising and lowering the arms by means of pin *i'*.

Arms *d d'* are connected by pin *o*, which slides in slot *s'*.

The relative motions of bars *e* and bars *x* are in opposite directions.

The hopper *h*, attached to the top of the frame *a*, has lateral slots *s* in its bottom across bars *e* and *x*, and wide enough to permit the oats to drop through them horizontally across bars *e* and *x* between knives *c* and *c'*.

Fig. 1 represents a part of hopper *h* broken away to show the relative positions of knives *c c'* and slots *s* when arms *d d'* are raised.

By lowering the arms the knives *c c'* are moved toward each other, cutting the oats between them.

The thickness of the bars *e* and *x* determines the fineness of the meal.

I claim as my invention—

1. The alternate parallel bars *e* and *x*, with their sides in continuous contact, and provided on their upper edges with knives *c c'*, and depressions across the top of the bars for the escape of the meal, substantially as shown and described.

2. The series of bars *e*, provided with knives *c* on their upper edges, in combination with bars *x*, provided with knives *c'* on their upper edges, and depressions across the top of the bars and between and on each side of the knives, and depressions *g g* on each side of the frame for the discharge of the meal, substantially as shown and described.

3. The hopper *h*, having lateral slots *s*, in combination with the bars *e* and *x*, knives *c* and *c'*, and depressions across the tops of the bars and on each side of the frame for the escape of the meal, substantially as and for the purpose hereinbefore set forth.

JOHN F. BYERS.

Witnesses:
FRANCIS J. WING,
GEO. W. COON.